United States Patent [19]
Smith et al.

[11] Patent Number: 5,403,479
[45] Date of Patent: Apr. 4, 1995

[54] IN SITU CLEANING SYSTEM FOR FOULED MEMBRANES

[75] Inventors: Bradley M. Smith, Hamilton; Ake A. Deutschmann, Burlington, both of Canada; Kenneth P. Goodboy, Wexford, Pa.

[73] Assignee: Zenon Environmental Inc., Ontario, Canada

[21] Appl. No.: 170,053

[22] Filed: Dec. 20, 1993

[51] Int. Cl.$^6$ .............................................. B01D 63/00
[52] U.S. Cl. ............................ 210/321.69; 210/321.8; 210/321.89; 210/257.2; 210/195.2; 210/636
[58] Field of Search ...................... 210/636, 108, 195.2, 210/257.2, 791, 321.69, 333.9, 106, 321.8, 321.89, 321.87, 321.88, 500.23

[56] References Cited

U.S. PATENT DOCUMENTS

| | | | |
|---|---|---|---|
| 4,414,113 | 11/1983 | LaTerra | 210/321.69 |
| 4,767,538 | 8/1988 | Sakubowski et al. | 210/636 |
| 4,767,539 | 8/1988 | Ford | 210/636 |
| 4,840,768 | 6/1989 | Nejigaki et al. | 210/636 |
| 4,921,610 | 1/1990 | Ford et al. | 210/321.69 |
| 4,980,066 | 12/1990 | Slegers | 210/321.69 |
| 5,043,071 | 8/1991 | Anselme et al. | 210/195.2 |
| 5,047,154 | 9/1991 | Comstock et al. | 210/636 |
| 5,132,015 | 7/1992 | Dawn | 210/321.69 |
| 5,209,852 | 5/1993 | Sunaoka et al. | 210/636 |
| 5,248,424 | 9/1993 | Cote et al. | 210/636 |

FOREIGN PATENT DOCUMENTS

4-265127  9/1992  Japan .

Primary Examiner—Robert A. Dawson
Assistant Examiner—Ana M. Fortuna
Attorney, Agent, or Firm—Alfred D. Lobo

[57] ABSTRACT

A method and cleaning system is disclosed for cleaning the outer surface of a fouled microfiltration (MF) or ultrafiltration (UF) semipermeable hollow fiber membrane after its initial stable transmembrane flux has been decreased to an unacceptably low level. The method is specifically applicable to any fiber used to withdraw purified water from dirty water, particularly water containing organic matter including beneficial bacteria and/or undesirable inorganic salts, where the viability of the bacteria population is to be maintained. The membrane is cleaned by flowing a cleaning fluid, preferably a biocidal oxidative electrolyte having an oxidizing anion and an associated cation through the clean, permeate-side of the membrane, at low pressure no more than the bubble pressure breakthrough, usually <300 kPa (30 psig) for a MF or UF fiber. Such low pressure is sufficient to diffuse the electrolyte through both, the pores of the membrane and a fouling film which typically includes a biofilm accumulated on the fibers' outer surface, but not enough electrolyte flows through the membrane to kill numerically more than 20% of the living bacteria in the dirty water. This limitation can be met only if the cleaning period is brief. This period is only long enough to oxidize organic matter within the pores and kill essentially all bacteria in the biofilm. Preferably less than 5% of the bacteria population is decimated. As diffusion takes place, pores are again opened, both in the wall of the fiber and through the biofilm, and when the fibers are returned to normal operation, the restored flux is equal to at least 70% of the initial stable flux.

2 Claims, 8 Drawing Sheets

IN SITU CLEANING SYSTEM FOR FOULED MEMBRANES

BACKGROUND OF THE INVENTION

This invention relates to a cleaning system for substantially restoring transmembrane flux (hereafter "flux" for brevity), measured as liters of permeate per square meter of membrane surface per hour (L/m$^2$.hr or "LMH"), in fouled, porous/semipermeable microfiltration (MF) or ultrafiltration (UF) membranes in a membrane device (module) used to recover purified water from contaminated or "dirty" water in feedstream, without draining the feed (substrate), hence referred to as an "in situ cleaning" method. A MF or UF membrane is generally used to separate one liquid, usually water, from water containing various forms of undesirable matter, some in solution and some not. Such a membrane device which is to be periodically cleaned, usually operates in "inside-out flow" in which the inner surfaces of the membranes are exposed to the feedstream of "dirty" water from which purified water is to be separated. In contrast, this invention relates to hollow fiber membranes ("fibers" for brevity) which typically operate in "outside-in" flow. By hollow fiber membranes we refer to membranes having an inside diameter (i.d) in the range from about 0.2 mm to 4.0 mm, with a wall thickness which corresponds to a particular diameter, the outside diameter (o.d.) usually being in the range from about 0.3 mm for the smallest fibers to about 6 mm for the largest.

The term "dirty" water is used herein, in a generic sense to refer to any poor quality aqueous, or predominantly aqueous solution, suspension, dispersion or emulsion. Purified water is extracted from the dirty water with a desirably high flux despite the membrane being covered, in about 8 hr or less, with a "fouling film" deposited by "foulant(s)" in the substrate. This formation of the film is also referred to as concentration polarization which is unavoidable in practice. A foulant film formed in an aqueous medium rich in microorganisms ("biomass") is termed a "biofilm", and the fouling phenomenon is referred to as "biofouling". By "rich in microorganisms" we refer to a cell count in excess of 5000 CFU/ml (colony forming units/ml). Other types of fouling occur in other applications, for example in the purification of water containing multivalent cations in the form of Ca Mg Si Fe and Mn salts (carbonates, oxides, chlorides and the like). When the fouling film decreases the desirably high flux, the membrane is cleaned to substantially restore the flux to a desirable level.

The cleaning method of this invention is particularly directed to cleaning fibers, rather than tubular membranes or spiral wound membranes. Fibers are used in a module, either in an array or in a bundle, deployed directly in a substrate without being enclosed; or, the array may be appropriately held within a shell. With fibers enclosed in a module, feed flowed through the shell side and over the outer surfaces of a multiplicity of fibers held therewithin, and emerging from the shell, is referred to as retentate or, more preferably, concentrate; and, liquid which is separated by, and flows through the microporous membrane into the lumens of the fibers is referred to as "tiltrate", or preferably, "permeate".

Restoration of the flux is effected on the permeate side of the membrane, with a cleaning fluid, most preferably an aqueous cleaning fluid, under only enough pressure, below the bubblepoint of the fiber, which for reasons given below, is believed to provide diffusion-controlled permeation. Other mechanisms may also play a part in cleaning. For example, since the membranes used herein are of a synthetic resinous material, rather than being ceramic, they are susceptible to swelling caused by interaction with the cleaning fluid.

Diffusion-controlled flow occurs at low pressure through the walls of the membranes and out into the feed (hence referred to as "inside-out flow" of a "substantially pressureless" cleaning solution). The definition of "diffusion-controlled" permeation is that which occurs at a pressure below the "bubble-pressure breakthrough" (or "bubble-point") for a membrane, and the permeating rate "J" is measured in gm-moles/sec/cm$^2$. This definition is adapted from a method for measuring the pore sizes of a membrane by diffusion of air through water which fills the pores of the membrane at the "bubble-pressure breakthrough" for a membrane. Strictly, the pressure at breakthrough is measured by the force required to force one immiscible fluid through the pores of a membrane previously filled with a second immiscible fluid. (see Membrane Handbook edited by W. S. Winston Ho and Kamaalesh K. Sirkar, Chapter VII "Ultrafiltration" pg 426 Van Nostrand Reinhold, New York). This method was originally practiced by placing a water-filled membrane with air impingement from below. Bubbles of air penetrate the membrane into an overlying water layer. The largest pores open at the lowest pressure; thus, by slowly increasing the air pressure (1 bar/min) and monitoring air passage, a pore size distribution can be estimated. Though all pores are filled with water, gas will dissolve at the upstream face of the membrane, diffuse through the pores in solution and come out of solution at the lower pressures downstream of the membrane.

The value for the permeating rate is calculated from the following equation:

$$J = (N \pi d^2)/4 \, (DH) \, (\Delta P/l)$$

where $J$ = permeating rate, gm-moles/sec/cm$^2$
$N$ = pore density in number/cm$^2$
$d$ = pore diameter in cm
$D$ = diffusivity of the gas (N$_2$) in water at 20° C. = $1.64 \times 10^{-5}$ cm$^2$/sec
$H$ = solubility of the gas (N$_2$) in water at 20° C. = $6.9 \times 10^{-7}$ gm moles/at/cm$^3$
$\Delta P$ = pressure differential (atm) across the membrane.

For example, a membrane having a pore size of 0.27 $\mu$m, a pore density of $6 \times 10^7$ pores/cm$^2$, and a thickness of $10^{-3}$ cm (10 $\mu$m) has a diffusion rate of $J/\Delta P = 3.89 \times 10^{-10}$ gm moles/sec/atm/cm$^2$, and using the gas constant this becomes 0.0355 ml/min/psi/ft$^2$. For a 15 ft$^2$ cartridge tested at 30 psi the permeating rate is about 16 ml/min. (see Handbook of Separation Techniques for Chemical Engineers M. C. Porter, Appendix A).

The membrane device most preferably used for purifying non-sterile aqueous streams is a frameless array of fibers, immersed in an arbitrarily large body of water. Such a device is disclosed in U.S. Pat. No. 5,248,424 to Cote et al. An alternative is to use a device of the "shell and tube" type in which the permeate is collected from the lumens of the fibers. Such a device is disclosed in U.S. Pat. No. 5,232,593 to Pedersen et al. A device of either type is referred to herein as a "module".

When fibers are used, only the permeate flows into the lumens, and the lumens are not fouled under normal operating conditions. Therefore there is no logical reason to consider flowing a cleaning solution through the lumens.

A typical module is used to separate one liquid from another having clusters of molecules, or larger molecules than those of the liquid to be separated; or, to separate one liquid from another liquid containing a suspension or dispersion of micron-size inorganic particles or organic particles. Such particles include bacteria both dead and alive, or, a colloidal suspension of submicron size solids, or an emulsion, from which the aqueous component is to be separated.

Depending upon whether the particles are microscopic or submicroscopic in size, the membranes may have pores ranging in size from as large as 5 $\mu$m (micrometers or microns) or as small as 50Å, and are commonly termed "semipermeable" membranes. Membranes with circumferential walls having relatively large pores are used in MF. The pores in a MF membrane range from about 300Å to 20,000Å in nominal diameter; and those in a UF membrane, from about 50Å to about 1,000Å (0.1 $\mu$m).

Of particular interest herein is the separation of purified water from "dirty" water containing undesirable metal oxides, carbonates, etc. and/or a live biomass, or a non-sterile organic or inorganic "floe", the purified water passing through the walls of a semipermeable membrane into the "permeate side" of tube and fiber membranes (outside-in flow) in the module.

The fouling film is a thin continuous layer which develops on the surface of the membrane within the first 0.25-3 hr, generally no more than about 8, after the membrane is placed in operating service. Presence of the film is inferred from concentration of foulant in the substrate feed. Such concentration may be measured as the cell count in the water phase, or the concentration of metal salts, and is judged in terms of how much performance (flux) has dropped below target. The target flux is normally the initial stable flux obtained in the 9th or 10th hour, but often in the 5th or 6th, after a new membrane is contacted with dirty water. A biofilm typically comprises cells, both dead and alive, cell debris and extracellular polymer substances (EPS), with the EPS accounting for a substantial portion of the biofilm's dry mass. Wet biofilm may contain up to 95% or more of water.

In the aforementioned filtrations with membranes, the phenomenon of microdroplets of emulsifiable organic liquids, hydrocolloids and solute particles rejected by the membrane, tend to form a viscous and gelatine-like "fouling layer" which becomes part of the fouling film on the membrane even if there are no bacteria in the suspension, and there usually are. Thus, in addition to the resistance to flow of permeate due to the physical properties of the membrane, and, the boundary layer and biofilm formed under the conditions of its environment, there is the additional resistance due to concentration polarization. Since, in addition, the fouling film attracts live bacteria and permits their build-up, the flux will rapidly drop below 10 LMH, below which one cannot usually realistically expect to operate a commercial module either effectively or profitably.

When a fouling film is formed, irrespective of the source or origin of fouling, cleaning as taught herein provides such good diffusion through whatever film is left (typically essentially none) after cleaning, that the flux, after cleaning is within 30%, preferably within 20% of the flux measured after a new and unused membrane is placed in the same service for a sufficient time to exhibit a stable, and desirably high flux after an initial soak period. This soak period varies from about 0.25 hr to 5 hr depending upon the characteristics of the bacteria and suspended solids in the dirty water. This stable, desirably high flux obtained after the initial soak period is referred to as "the initial stable flux".

Up to the present time, cleaning membranes in a module referred to includes removing the fouling film by applying biocides, cleaners or physically scouring the membrane when membrane geometry allows. (see article titled "Biofouling—a Biofilm Problem" by H. C. Fleming, G. Schaule and R. McDonough, in Membrane Preparation - Fouling - Emerging Processes, European Society of Membrane Science and Technology, P. Aimar and P. Aptel Editors, Vol 6, 1992). Trying to restore the permeability and flux of a membrane generally requires dealing with the film formed on the surface of the membrane, unless the "dirty" water is sterile. Fleming et al did this by adding a commercial cleaner containing non-ionic and anionic surfactants which was forced through the biofilm layer and membrane. This was followed, once the permeability was constant, by washing the cleaned membranes with clean water. Their experiments were focused on determining the relative permeability of a model biofilm with different cleaners; and their effect on the relative height of the biofilm layer (cleaners had little effect).

In further experiments, they coated a membrane with biofilm by suspending the membrane in dirty water containing bacteria and a high EPS. They then exchanged the water for a cleaning agent, and filtered it until a constant permeability was seen. They then exchanged the cleaning agent for water and again filtered until a constant permeability was seen. They followed the same protocol in each case except that one set of data was measured with stirring during filtration, and the other was with no stirring. Since in each case the cleaner was filtered until a constant permeability was seen, they were unaware of how much cleaner had been filtered at that point. Further, since there was no substrate on the "other" side of the membrane during any of their filtration steps, they clearly evinced no interest in the effect of the cleaner which they had filtered. They had no reason to evince such an interest because they failed to conceive the importance of cleaning the membrane without removing substrate.

But it was known that cells in the biofilm are more resistant to biocides than those in free suspension, and that simply killing cells had little effect with reference to restoring the flux. Still further, since Fleming et al showed that enhancement in permeability due to the application of cleaner was due to an alteration of the biofilm, not removing it, it was clear that the biofilm did not have to be removed before the flux was sufficiently restored to return to normal operation.

Since the Fleming et al experimental method was an adaptation of the prior art method in which sufficient biocide was introduced into the dirty water to kill all bacteria, a desire to save beneficial bacteria rules out either method. In the prior art, in those particular instances where the bacteria were to be saved, the tank of dirty water is drained, or the membrane removed from the tank before the biocide is applied to the outside surfaces of the membranes. The problem is that though this method may kill all the bacteria, it does not generally remove the biofilm, and dead cells may stick to the biofilm, and usually do.

Most importantly, the prior art failed to realize that it was possible to kill most, if not essentially all, or only a controlled minor proportion of live bacteria in the fouling film, yet restore the flux. We deliberately kill only a controlled amount of the bacteria in the feed, but not so many as to be economically debilitating. This concept of deliberately sacrificing a controlled minor proportion of live bacteria on the feed side, outside the fouling film, to kill essentially all in the biofilm, is the essential basis of this invention.

With this concept it was feasible to employ the known principles of biocidal cleaning, namely that it improves performance because (i) cleaning with a biocide reduces the thickness of the biofilm, and (ii) biocides improve the permeation properties of the remaining biofouling film, though this second effect was underestimated in the prior art. It was because this second effect was targeted, that we realize the unexpected improvement provided by this invention.

Despite the findings of Fleming et al, the prior art failed to clean membranes in aqueous, non-sterile service (a) without either draining the dirty water to flush the membranes with a biocide, or, (b) without adding the biocide to the tank to kill all cells and withdrawing the biocide through the membrane until the flux was restored to a desirable level, or (c) without removing the membranes from their aqueous medium (dirty water reservoir) to clean them. Fleming et al sought to control development of the biofilm by control of the nutrient in the system, not by sacrificing up to 20 per cent of the live bacteria in the feed in the interest of flux restoration sufficient to justify return to normal operation.

Thus, to date, it has not been possible to restore the flux of a biofouled membrane without leaving an objectionable concentration of cleaning fluid (solids are unusable in lumens) in the dirty water, even if one was prepared to kill all cells. Much less was it possible, substantially to restore the flux without killing more than a controlled amount of live cells in the biomass, while killing essentially all those cells which clog the pores of the membranes.

In most membrane-separations of dirty water to recover purified water, dirty water is passed over the outer surfaces of small diameter organic or inorganic hollow fiber membranes, or through tubes, or, through a roll, and the desired liquid is recovered as a permeate which passes through the membrane and flows out the permeate-side of the membrane device. Despite the effectiveness of fibers, tubes and rolls for making a desired separation, all are so easily and badly fouled that whether such membranes can be used economically depends upon how well the fouling material ("foulant") can be quickly removed, sufficiently to restore their initial stable flux, or, to restore the flux to as close to that initial level as practical.

Because the surprisingly effective method disclosed herein for cleaning membranes uses a cleaning fluid which is most preferably a liquid biocidal oxidizing liquid, and it contacts the lumens of the fibers at low, negligibly small fluid velocity, if any, and typically at less than 1 meter/see through the lumens, the fibers are under only enough internal pressure to cause gentle permeation of the cleaning fluid through the membrane and fouling film. It is critical that the pressure for such gentle permeation be below the membrane's bubble point.

This limitation applies whether the cleaning fluid is recirculated, held stagnant, or pulsed. Because under recirculation or pulsed conditions the cleaning fluid is in laminar flow, the method is also referred to as "in situ diffusion cleaning". Such cleaning occurs even when the fluid is simply held in the fibers at no velocity, under only enough pressure to allow the fluid to diffuse through the membrane into the reservoir in which the membrane is immersed. It also occurs under low pressure (below bubble point) pulsing of the cleaning fluid to urge the fluid to take a path other than through already-clean pores, thus to improve distribution of the fluid on the permeate side, and to vary the flow pattern of distribution of fluid as the membrane's flux is restored. Since in each case there is very little flow of biocidal solution through the lumens of the fibers, and in one case (velocity=0 meter/sec) there is none, the cleaning system of this invention does not require a conventional holding tank such as used in a prior art clean-in-place system. The biocidal liquid in our system may be dispensed from a container the fluid volume of which is only slightly greater than that of the sum of the lumens of all the fibers to be cleaned simultaneously, or the sum of the bores of all the tubes, or all the spiral passages. The solution is recirculated when it returns to the container.

A further unexpected advantage is that there is no need to counteract or recover the cleaning fluid which diffuses into the feed since that amount is too small to be objectionable, typically less than 10 ppm in a reservoir of substrate, and is biooxidized at that low concentration, negating biocide build-up.

The importance of being able to maintain the surface of a membrane clean enough to make its use in a separation process practical was the primary topic of a symposium held a decade-and-a-half ago and reported in a chapter titled "Fifteen Years of Ultrafiltration" by Michaels, A. S. in Ultrafiltration Membranes and Applications edited by A. R. Cooper (American Chemical Society Symposium, Washington, 9–14 Sept. 1979, Plenum Press, New York (1980). A flux of at least 20 LMH, preferably 50 LMH, is generally desirable in commercial separations, the higher the flux, better; and as stated above, a flux below 10 LMH is generally deemed unacceptable for the purpose at hand.

The unremitting search over the past fifteen years, for better systems to provide clean working surfaces on a membrane for long period of time, at least clean enough to provide a commercially acceptable flux, has been singularly unrewarding. As a result much energy and time has been spent on the development of semipermeable membrane compositions which are less readily fouled than ones providing comparable duty in the same or an analogous service.

To clean deposits left on a membrane when dirty water (outside-in flow) contacts its outer surface, as it most often does, two cleaning methods are now generally used. A first method relies on cleaning a fouled outer surface from the outside; the second relies on cleaning the fouled outer surface from the inside. In such prior art methods the outer surface may be that of a fiber, or a tube, or a roll; the method of this invention is mainly applicable to fibers.

In the first method which relies on cleaning a fouled outer surface from the outside, the fouled surfaces are scoured, sometimes after a soaking period in a cleaning solution made up of specific chemicals. Scouring is effected by a suspension of finely divided solids which have essentially no affinity for the membrane, the solids having a diameter larger than the largest pores in the membrane so as not to be trapped therein, the scouring action being controlled by the rate at which the suspension is flowed over the membrane surfaces.

An alternative first method uses a chemical cleaning solution to remove the solid or semi-solid matter which is deposited on the membrane's outer surface. Such a cleaning solution is aptly formulated to dissolve or chemically react with the organic or inorganic matter deposited on the membrane. A drained module may be soaked in the solution, or the solution may be recycled through the shell-side of the module until the fouling matter is chemically degraded and dislodged. It will be understood that in outside-in flow, the permeate side of the membrane (the lumens of fibers) does not get fouled because essentially no solids pass through a membrane.

To clean the exterior by exercising either of the above options, the feed must be shut off, and the module is preferably taken out of service and drained, before the chosen cleaning fluid in the appropriate concentration, is introduced in lieu of the feed. The cleaning solution is recycled over the surfaces of the membrane until they are cleaned, then discarded to drain. If a bioreactor is available, the cleaning solution is collected and gradually bled into the bioreactor where the chemicals and fouling solids are biodegraded.

Representative conventional clean-in-place systems without draining the feed are illustrated in articles titled (i) "Improved Product Rinsing Efficiency with Multitubular Ultrafiltration" by W. J. Allshouse and Masatake Fushijima, ELECTROCOAT '84, pg 14-1 to 14-13; (ii) "New Developments in Ultrafilter System Design" by Mark Rizzone, ELECTROCOAT '88, pg 11-1 to 11-39; in a reference manual titled "Koch Spirapak Electrodeposition Paint Ultrafiltration Modules" published June '89 by Koch Membrane Systems, Inc.; and in bulletins "ZPF8-Series Ultrafiltration Systems" and "LF-Series Reverse Osmosis Systems from 60 to 300 gpm" published by Zenon Environmental Systems Inc. Most recently a liquid back-washing system has been used for fibers in which permeate is withdrawn in outside-in flow. The fibers are cleaned by flowing a solution of cleaning agent through a bundle of fibers after the flow of the solution is blocked. There is no enablement of diffusion-controlled flow. No bacteria population is stated to exist in the medium, nor is there concern for maintaining the bacterial population. (see Japanese patent publication JP 4-265127A, Sept 1992).

It is important to note that reference to "back-washing" or "back-flushing" fibers in the prior art does not refer to recirculating liquid through the lumens of fibers because the pressure drop of cleaning solution through the lumens is so high. The fact that diffusion-controlled permeation did not require a substantially pressurized solution escaped notice. Because it is impractical to recirculate even a low viscosity liquid such as DI water through hollow fibers, the conventional method of "back-flushing" on the inside was with blocked fibers, that is, dead-ended under pressure in excess of the bubble point, or by the gas-distension method referred to herebelow, also under pressure in excess of the bubble point.

The second method for cleaning porous, elastic, hollow fibers from the inside, is the popular gas-distension method. This method comprises introducing a gas into the fibers under sufficient pressure to pass through the walls of the fibers, in a direction opposite to that in which the feed is being filtered, so as to dislodge solids retained on the walls of the fibers. This method is the subject of U.S. Pat. Nos. 4,767,539 and 4,921,610 to Ford, and related patents assigned to Memtec Limited. According to the '539 and '610 processes, for "outside-in" flow, gas is introduced into the lumens of the fiber as the back-wash medium, optionally after "back-flushing" ("back-washing" and "rinsing" are two other terms used interchangeably in the art with back-flushing) with permeate. Preferably the gas pressure in the lumens swells fouled fibers to enlarge their pores making it easier to free the particles lodged in the pores, and to carry them away in the expansion of the back-wash gas. Such a system is commercially available as a Memcor microfiltration system (Memtec).

To use the gas-back-flushing system effectively it is desirable to have highly elastic membrane walls which have pores which return to their original size after "explosive decompression" of gas through them. In such instances, one may first use a permeate back-flush and follow it with a gas back-flush. The chief drawback of the intermittent gas-pressurization process is that it places great strain on the membrane and relies on mechanically dislodging fouling matter which, for the most part is adhesively bonded to the membrane wall with physico-chemical forces such as Van der Waal's forces and the like, and perhaps also with covalent bonds.

Figure 5:
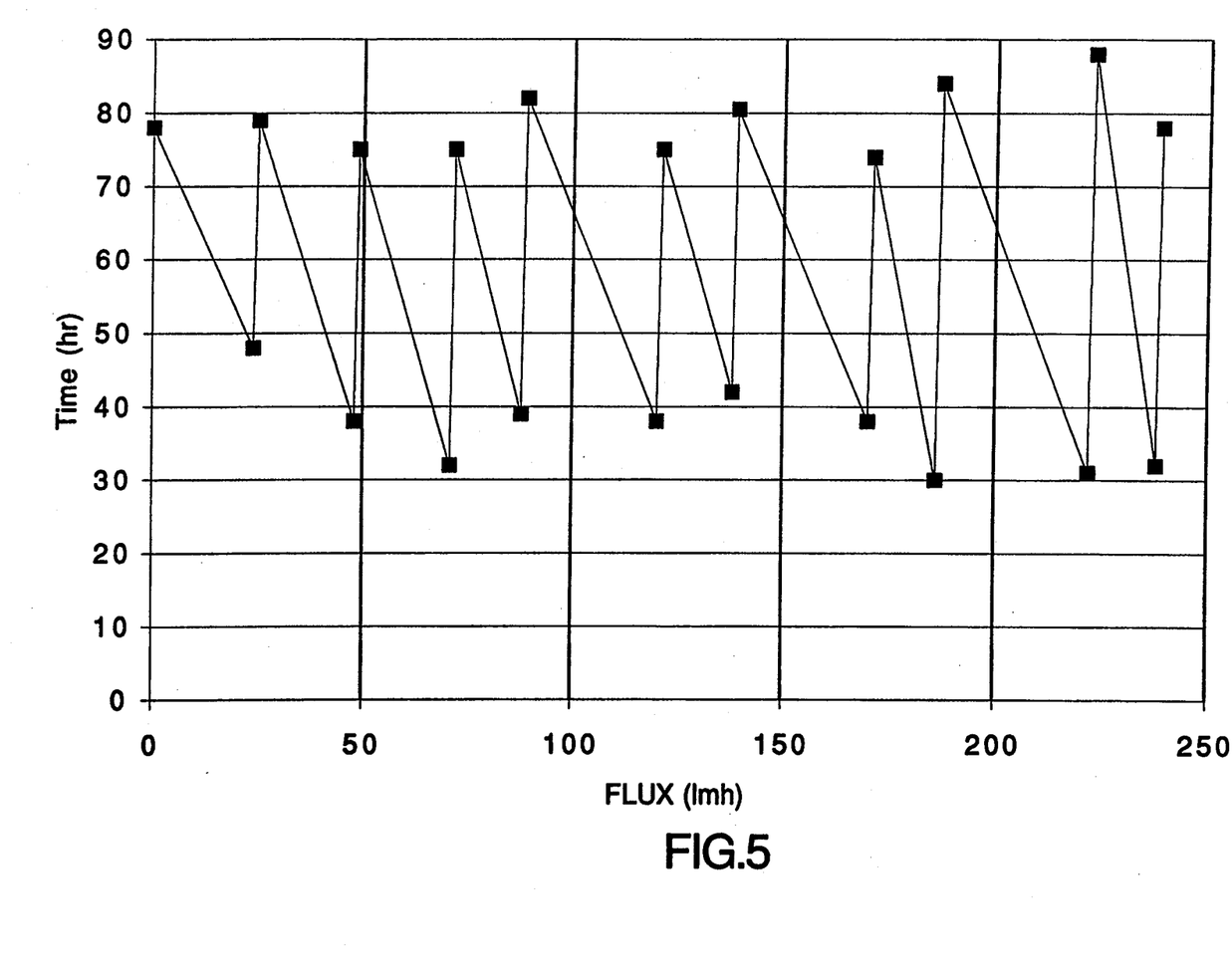
FIG. 5 is a graph in which the variation of flux is plotted as a function of time, showing the results obtained by back-flushing for only 15 min per 24 hr of operation, the lumens of polyfluorovinylpyrrolidone fibers used to filter domestic wastewater having a high $BOD_5$ of 1,800 mg/L after the fibers are fouled sufficiently to halve their initial transmembrane flux of about 78 LMH.

As will be seen from the data presented in FIG. 5, back-flushing a polysulfone fiber at 175 kPa with permeate, or even deionized RO water, is far less effective than diffusion-cleaning with an oxidative anion such as a halogen, e.g. fluorine, chlorine, bromine or iodine. To obtain the desired explosive decompression of gas through the pores, the permeate side of the membranes is shut off, or "dead-ended".

Another, and older, method of cleaning fouled hollow tubes in particular, from the inside without draining the feed, requires back-flushing with permeate under relatively low pressure, particularly limited by the tolerance of the membrane to hydraulic pressure. The phrase "relatively low pressure" refers to pressure exerted by the gas-cleaning system which uses sufficient pressure to distend the membrane and dislodge foulant particles trapped in the membrane pores. As one would expect however, because back-flushing relies on loosening solid particles on the surface by forcing them off with hydraulic forces, it is not as effective as short bursts of pressurized gas. The hydraulic forces act over a much longer period of time than do the forces of a pressurized gas, and the time during which they act provides enough time for the hydraulic fluid to find a path of less resistance than that of the path blocked by fouling solids.

The hydraulic back-flushing system is also referred to as "dead-end" washing because the discharge of the manifold carrying fluid from of the bores of the fibers is blocked to allow the build-up of necessary hydraulic pressure above 240 kPa. The cleaning solution is held for a period of time under pressure, then drained through the discharge into a spent cleaning-solution tank.

This prior art back-flushing method is only effective when the cleaning solution is relatively non-toxic because a large portion of the cleaning agent escapes through pores which are not plugged, or only partially plugged, and also through pores after they are cleaned and before the hydraulic pressure is removed. Since, after cleaning fibers in raw or "dirty" water, by back-flushing with toxic cleaning solution, clean water is withdrawn into the fibers as permeate, the toxic cleaning solution re-enters the fibers with the permeate. Even if the amount of cleaning agent re-entering with permeate is insignificantly small, a far greater amount of cleaning agent is used than is necessary to effect desirable cleaning. Finally, in the special instance where the fibers are withdrawing water from a medium containing live biomass, particularly a biomass which desirably helps purify the water, the discharge of a relatively large amount of toxic cleaning solution into the biomass kills so many cells that it takes an abnormally long period to return the biomass to its desired cell concentration, if it can be returned at all.

Further, to cope with the release of excess cleaning agent into the water to be purified, the cleaning agent is used infrequently, compensated by frequent back-flushing with permeate. Whether by forward or reverse flow, permeate helps significantly to maintain clean membrane surfaces. But back-flushing with permeate recycles it at the expense of permeate production and can only be justified when the cleaning effect of back-flushing is great enough to overcome the economic disadvantage. Thus substituting cleaning agent for gas in the '539 and '610 processes fails to provide a controllable, diffusion-controlled, substantially pressureless cleaning system.

Moreover, back-flushing a membrane's outer surfaces with biocidal solution, then back-flushing inner surfaces with permeate, is generally limited to processes in which the operating transmembrane pressure is relatively low, in the range from 1-3 bar, at which low pressure the solids are not forced into the pores of the membrane. In those instances when the flux is relatively low, in the range from 5 to 20 LMH, the fluid velocity of cleaning fluid to clean from the outside is too low. If cleaned with high velocity fluid the cleaning liquid enters the lumens, making this an unrealistic alternative.

It will now be appreciated that the cleaning systems which can be operated effectively without draining the feed, include those using pressurized back-flushing with a biocidal solution, such as in the Japanese system of JP 4-265127A and those using pressurized back-flushing with a gas, such as in the Ford '539 or '610 gas-distension systems.

It is not practical to back-flush fibers with permeate because the cleaning effect of permeate is solely due to hydraulic pressure and is therefore relatively ineffective. Further, to obtain a minimum liquid velocity of 1 meter/see of permeate through a lumen 1 mm in diameter, at a pressure below the bubble-point of the membrane, the pressure drop through the lumen is so high that a length of fiber only 1 meter, requires fiber-bursting pressure at the inlet to generate a pressure below the bubble-point, at some point downstream of the inlet. When the pressure does not exceed that which can be tolerated by the fibers, tubes or rolls, and they are back-flushed with permeate at such pressure, permeate is lost to the feed.

In the other methods, if the fibers are to be cleaned from the outside, the feed is shut off and drained, as is the permeate, the fibers are soaked in cleaning solution, washed and rinsed, on their outside surfaces, then finish-rinsed with fresh permeate before the membranes are returned to service.

Specifically with respect to hollow fiber membranes having an inside (lumen) diameter in the range from 0.5 mm to 5 mm, the feed is always on the outside. The i.d. of a fiber is at least 20 $\mu$m and may be as large as about 3 mm, typically being in the range from about 0.1 mm to 2 min. The larger the o.d., the less desirable the ratio of surface area per unit volume of fiber, but the lower the pressure drop for a back-flushing cleaning fluid. The wall thickness of a fiber is at least 5 $\mu$m and may be as much as 1.2 mm, typically being in the range from about 15% to about 60% of the o.d. of the fiber, most preferably from 0.5 mm to 1.2 mm.

The average pore cross sectional diameter in a fiber may vary widely, being in the range from about 5Å to 10,000Å. The preferred pore diameter for ultrafiltration of components in a substrate feedstream being in the range from about 5Å to 1,000Å; and for microfiltration, in the range from 1,000Å to 10,000Å.

It will now quickly be evident that a module containing fibers, whether held in arrays framed in wafers or frames, or held in oppositely disposed manifold means or "headers" in frameless arrays, may be viewed as being analogous to a liquid-liquid shell-and-tube heat exchanger. To clean fouled tubes in the exchanger is only possible in the unique situation where a first liquid is recycled through the tubes either to heat (or cool) a second liquid in the shell side, and the tube side gets frequently fouled. In this situation one may switch from recycling the first liquid to recycling a cleaning solution which can provide substantially the same heating (or cooling) function as the first liquid. After an appropriate amount of time, when the fouled tubes are clean enough, the cleaning solution is run into a cleaning solution holding tank and the first liquid is substituted.

Moreover, if one were to consider it, in the same manner as one might consider flowing cleaning solution through large diameter membrane tubes, the logical approach would be to pressurize the fibers with the cleaning solution from within, to reap the benefits of both (a) a higher flux for the cleaning solution, and (b) enlargement of the pores such as is obtained with the gas pressurization process. The obvious way to pressurize the fibers is to "dead-end" them, that is, to block the discharge of the cleaning solution from the outflow end of the lumens so as to force the cleaning solution out of the pores under high pressure greater than the bubble point of the membranes.

Assuming the membrane's performance is unaffected by an arbitrarily large number of dead-end back-flushing cycles, the problem with such cleaning is that it uses far more cleaning solution than is necessary, and is time-consuming compared to our cleaning method. Apart from the expense, since cleaning solutions are far from inexpensive, they are also highly toxic to bacteria which one may deliberately wish to keep in a biological treatment system containing plural frameless arrays, for their ability to biodegrade contaminants which may be present in the water.

An obvious drawback of cleaning from the outside of a tube or fiber, rather than from the inside, is that to do so requires a shell. If there is no shell, as in a frameless array such as one disclosed in the '524 array must be removed from the process reservoir in which it operates and immersed in a cleaning solution in another tank. An alternative is to drain the process reservoir and to substitute cleaning solution; then drain the cleaning solution after cleaning, and refill the reservoir. As is evident, this is a highly undesirable alternative.

Further, cleaning from the outside of a tube or fiber requires a large volume of cleaning solution since the system holdup volume must be filled. The permeate side volume is very small in comparison. Finally, any cleaning solution applied to the outer surface of a tube or fiber from the outside, is typically done under sufficient pressure to force the solution from outside the membrane through the biofilm on it and its pores. To save on time in the cleaning cycle, a relatively high pressure is applied, higher than is otherwise necessary, and such pressure has the effect of compacting the gel layer and foulants on the membrane wall, thus exacerbating the cleaning problem. Cleaning from the inside, particularly with continuous recirculation through the fibers, avoids using a higher pressure than is necessary to permeate the membrane wall, that is, a pressure no higher than that required to produce laminar flow on the membrane's permeate side, until its surface is sufficiently clean as evidenced by the restoration of a desirable flux.

SUMMARY OF THE INVENTION

Highly effective cleaning of a module containing an UF or a MF membrane having a fouled surface is obtained during an unexpectedly short period, without draining feed (substrate) from the module, by introducing a chosen cleaning fluid into the permeate and recycling it through the lumens at low pressure in the range from about atmospheric but no more than the bubble-point of the fiber. The method comprises maintaining a selected low pressure no more than the bubble-point either continuously, or cyclically applied, over a short period of time, preferably less than 1 hr, sufficient to diffuse enough cleaning fluid through pores in the membrane into the dirty water, substantially to re-establish the initial stable flux. The low pressure may be substantially constant, or it may be deliberately varied within a period of less than 5 sec, preferably less than 1 sec. When pulsed to achieve pulsed diffusion, the pressure exerted by the cleaning fluid may vary from a minimum of about 100 kPa (1 bar, at least 0.1 psig, preferably 0.5 psig) for a "loose" MF (5 $\mu$m) to a maximum of 100 psig for a "tight" UF (50Å), within less than 1 sec, which pulsing affords diffusion-controlled permeation. The pulsed maximum pressure which provides diffusion-controlled flow depends upon the pore size and distribution of the membrane but is generally no higher than about 300 kPa. Such flow discharges a predetermined amount of cleaning fluid into the feed and effectively removes the fouling film sufficiently to restore the transmembrane flux to within 20% of its initial stable flux over a period of 24 hr. The amount of cleaning fluid discharged into the feed is so small with each cleaning cycle that, even after an arbitrarily large number of cycles greater than 1000, continued withdrawal of permeate from the feed contaminated with cleaning fluid, does not deleteriously affect the permeate quality. In all cases diffusion through the wall of the membrane under diffusion-controlled flow occurs in a surprisingly short time, which provides for a short cleaning period; and a short cleaning period is a critical factor in the commercial attractiveness of a membrane separation.

The clean-in-place process of this invention does not dead-end the fibers to be cleaned, and it does not use high pressure; nor does the instant process physically dislodge fouled particles from pores in which they may be trapped with mechanical force or hydraulic force, but by chemical attack which affects the chemical bond between the fouling compound and the wall of the membrane. By so doing, the process capitalizes on the superior effectiveness of chemically removing a "foulant" (fouling material) whether organic or inorganic, in contrast with mechanically doing so by reliance on enough mechanical or hydraulic pressure to obtain measurable, or evident membrane wall distension known to loosen the mechanical bond of the foulant to the membrane's wall.

Specifically, an aqueous cleaning fluid comprising a biocidal oxidative electrolyte in aqueous solution, having an active, preferably oxidizing anion and an associated, preferably active cation, is found to migrate through partially blocked pores in a membrane and chemically attack organic and inorganic fouling matter on the surface of the membrane until the fouling matter is removed from the pores. The oxidizing anion may be contributed by an aqueous organic acid, particularly mono and polycarboxylic acids such as citric or oxalic acid and inorganic acids such as phosphoric acid. Alternatively, the cleaning fluid may be a gas which can diffuse through the pores of the membrane and chemically react with the foulant to remove it. Such gases may be biocidal, or oxidative, or both, and include sulfur dioxide, chlorine, fluorine, ethylene oxide and the like.

It is therefore a general object of this invention to provide a method for restoring the flux of a surface of a microfiltration or ultrafiltration semipermeable membrane after the surface is contacted with a non-sterile aqueous substrate such as dirty water containing inorganic material which can be deposited on the surface, or beneficial bacteria, from which substrate purified water is to be withdrawn. When the substrate includes the bacteria, the purified water is to be withdrawn without vitiating the benefits of the bacteria population. Whether the dirty water contains undesirable inorganic salts, particularly water-soluble halides, oxides and sulfides of the transition elements of Groups VI, VII and VIII of the Periodic Table, or organic matter, the dirty water being non-sterile usually contains enough bacteria to produce an initial biofilm on the surface of the membrane, which initial biofilm, with time, gets progressively denser or thicker, or both. Operation with the initial biofilm is unavoidable, but the membrane's initial stable transmembrane flux soon decreases as a function of time by at least 20%. The method of restoring the flux comprises, contacting the surface with a cleaning fluid at a pressure no higher than its bubble pressure breakthrough, but enough to diffuse through said pores and said film, over a period sufficient to remove enough fouling film to provide a restored flux equal to at least 70% of said initial stable flux; discontinuing contacting the surface of said membrane with the cleaning fluid; and, re-establishing flow of purified water through the membrane.

In the specific instance when cleaning hollow fiber membranes in a bioreactor containing a biomass, using a biocidal solution which is also an oxidative electrolyte having an oxidizing anion and an associated cation, the pressure is no greater than the bubble-point but sufficient to diffuse through the pores and the biofilm, but insufficient to kill numerically more than 20% of living bacteria in the biomass so as to maintain the viability of the bacteria population in the bioreactor; withdrawing the electrolyte from within lumens of the fibers; and, reestablishing normal operation. Most preferably, this is done without blocking the flow of the biocidal solution, but if desired, the flow of the solution may be blocked so long as the pressure on the solution does not exceed the bubblepoint of the fibers, and the solution may be held in the lumens for long enough to remove most of the biofilm.

BRIEF DESCRIPTION OF THE DRAWINGS

The foregoing and additional objects and advantages of the invention will best be understood by reference to the following detailed description, accompanied by schematic illustrations of preferred embodiments of the invention, in which illustrations like reference numerals refer to like elements, and in which.

DETAILED DESCRIPTION OF PREFERRED EMBODIMENTS

Figure 1:
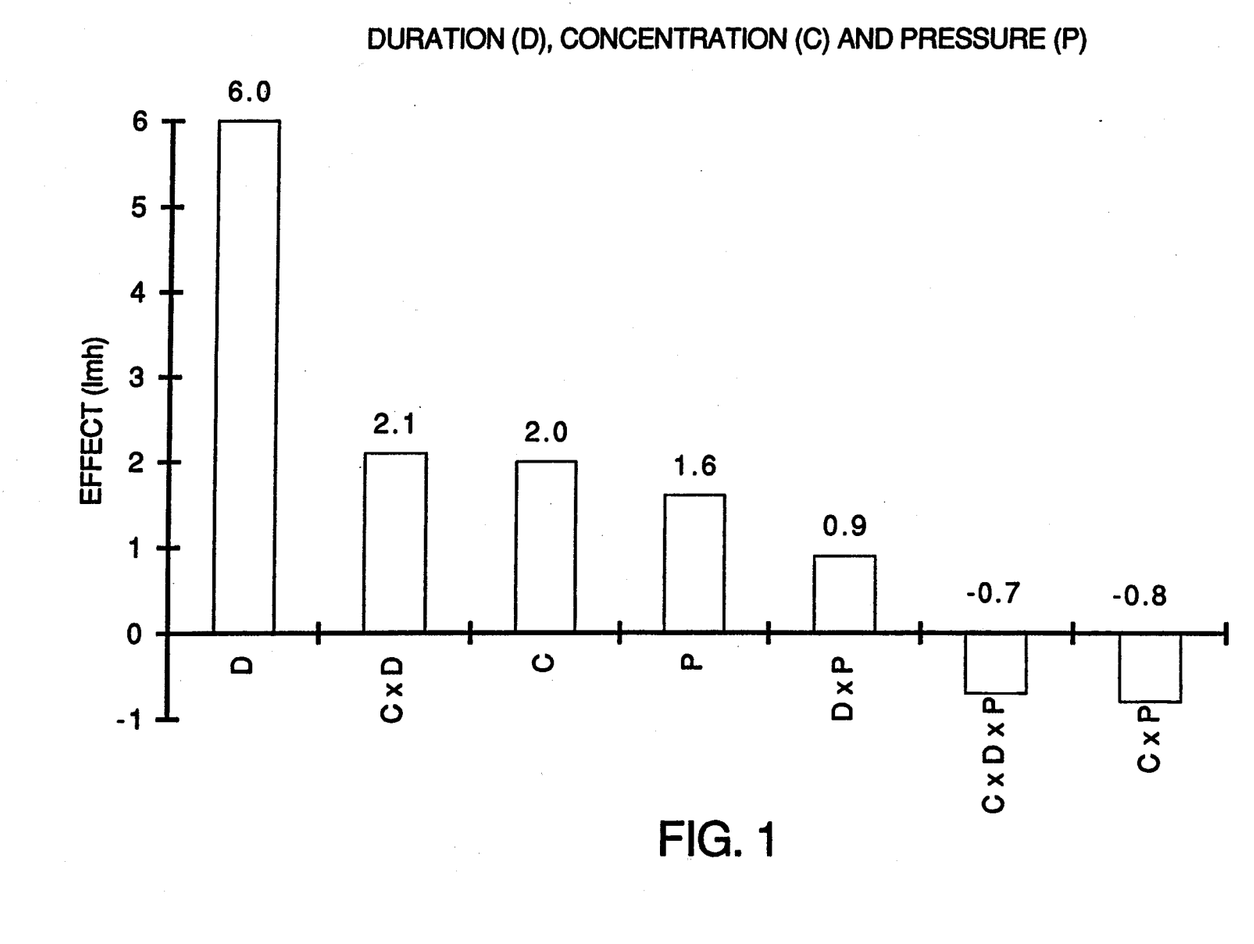
FIG. 1 is a bar graph depicting the results of a factorial analysis showing the average main effects and interaction of variables: time during which the cleaning fluid was in contact with the membrane, or "duration" (D), the concentration of the cleaning fluid (C), and the pressure of the cleaning fluid (P).

Referring to FIG. 1 there is shown a bar graph in which the results of a factorial analysis of data derived from in situ cleaning of polysulfone membranes were plotted. As is evident from the contribution of each variable to flux, plotted along the vertical axis, the duration of contact with the cleaning fluid is the variable with the most dominant effect. The next most dominant variable is concentration, followed by pressure which has the least effect. Since duration and pressure are the most influential variables, and these variables define the type of flow, we believe this flow to be diffusion-controlled flow.

The in situ cleaning process may be used in any membrane filtration system using hollow fiber membranes. The process is most particularly directed to water purification membranes such as are used in wastewater containing domestic sewage, chemicals, oily water, and pulp and paper byproducts; and, in surface water purification where the feed is brackish water or polluted lake water. In all of such environments the fouling film is to be removed sufficiently to restore the flux to desirable level relative to the initial stable flux. The in situ cleaning process is most preferred in particular situations where it is practical deliberately to kill no more than 20%, preferably <10% (cell count, CFU/ml) of the bacterial population in the interest of maintaining the beneficial effects of that population.

In all cases this invention relies on cleaning from the permeate side, that is, through the lumens of the fibers. In this manner, cleaning solution permeates through pores in the membrane and first reaches foulants embedded in those pores while the cleaning fluid is at its highest concentration, then permeates to the surface. The fluid thus has maximum effect on the foulant in the pore and in the fouling film.

Though less desirable than a liquid cleaning fluid, gaseous cleaning fluids such as chlorine, sulfur dioxide, ethylene oxide and the like are highly effective.

When a biocidal solution is used, it must first permeate the macroporous wall of the membrane in which essentially no bacteria are lodged (they cannot come through the skin and intermediate transport layers of a membrane) and attack bacteria, dead and alive, randomly lodged in the biofilm to provide a random network of pores through as much of the biofilm as is left. In general, there always is some biofilm left because the time over which diffusion takes place is insufficient to remove all the biofilm even if all the bacteria are killed in the biofilm.

The use of a biocidal solution which is incapable of diffusing through the biofilm easily will require too long a soak period and/or too long a recirculation period. Therefore the choice of biocidal solution is typically an oxidative electrolyte, and the concentration in which it is to be used, must be related to the transmembrane flux of that solution through the membrane to be cleaned and to the foulant(s) to be removed. By "oxidative electrolyte" we refer to one which at least has an active anion, and preferably also an active associated cation and include such materials as the organic peroxides and hydrogen peroxide. Preferred biocidal solutions and the foulants for which they are generally particularly effective are listed side-by-side in Table herebelow:

TABLE

| Cleaning solution | Foulant |
| --- | --- |
| Hydrochloric acid, HCl — pH 4 | Inorganic solids, $CaCO_3$ |
| 2.0 wt % citric acid + $NH_4OH$ — pH 4 | Inorganic colloids, metal oxides, $CaCO_3$ |
| NaOH — pH 11 | Organics, inorganic colloids, silica |
| 0.25 wt % HCHO followed by a detergent (with phosphate) | Biological matter |
| NaOCl with 100 ppm "active" Cl — pH 5 to 10 | Organics, biological matter |
| 1 wt % NaCl | General cleaning |
| 1 wt % oxalic acid — pH 2 to 4 | Colloids, iron oxides |
| 1 wt % $NaHSO_3$ — pH 5 to 6 | Colloids, iron oxides |
| 700 ppm EDTA/2500 ppm NaEDTA — ph 6 | Metals, $CaCO_3$, $MgCO_3$; oxide or sulphate scales |

It will be noted that the term "solution" is used since it is most convenient to use an aqueous biocidal solution of known concentration. If desired, non-aqueous liquid oxidant may be used if the amount diffusing through the membranes can be controlled. For example, fuming nitric acid, chloracetic acid, or non-aqueous HCl may be injected into permeate held in the piping and lumens, but it is difficult to inject just the right amount. Besides being a difficult "handling" problem, non-aqueous cleaning fluids are difficult to meter accurately in the minuscule amounts required.

The cleaning fluid chosen is preferably inert relative to the synthetic resinous material of the membrane though it may swell in contact with the cleaning fluid; for example, polypropylene fibers tend to be hydrolyzed with NaOCl solution, but are inert with respect to aqueous $H_2O_2$ (hydrogen peroxide); and, polysulfone fibers tend to swell in contact with NaOCl solution but are otherwise inert to the solution. Depending upon the toxicity to the bacteria population, as little as 10 ppm of the cleaning fluid can be effective.

With particular reference to a cleaning fluid which is a conventional biocidal oxidative electrolyte, a concentration no greater than 500 ppm of the active anion, e.g. $OCl^-$, or $Cl^-$ is preferred, since higher concentrations up to 0.1% by weight of the active anion fails to provide significantly improved performance. The temperature of the biocidal solution as well as its concentration may be raised provided neither is deleterious to the membrane, and th increased concentration provides a justifiable effectiveness of "kill" without jeopardizing the vitality of the bacteria population.

The fibers used in an array may be formed of any conventional organic membrane material. They are typically polymers which form an asymmetric membrane having a thin layer or "skin" on the outside or "shell side" of the fibers. Preferred materials for a base membrane which do not contain a repeating unit derived from acrylonitrile, are polysulfones, poly(styrenes), including styrene-containing copolymers such as butadiene-styrene and styrene-vinylbenzylhalide copolymers, polycarbonates, cellulosic polymers, polypropylene, poly(vinyl chloride), poly(ethylene terephthalate), poly(vinylidene fluoride), aromatic polyamides and the like disclosed in U.S. Pat. No. 4,230,463 the disclosure of which is incorporated by reference thereto as if fully set forth herein.

Figure 2:
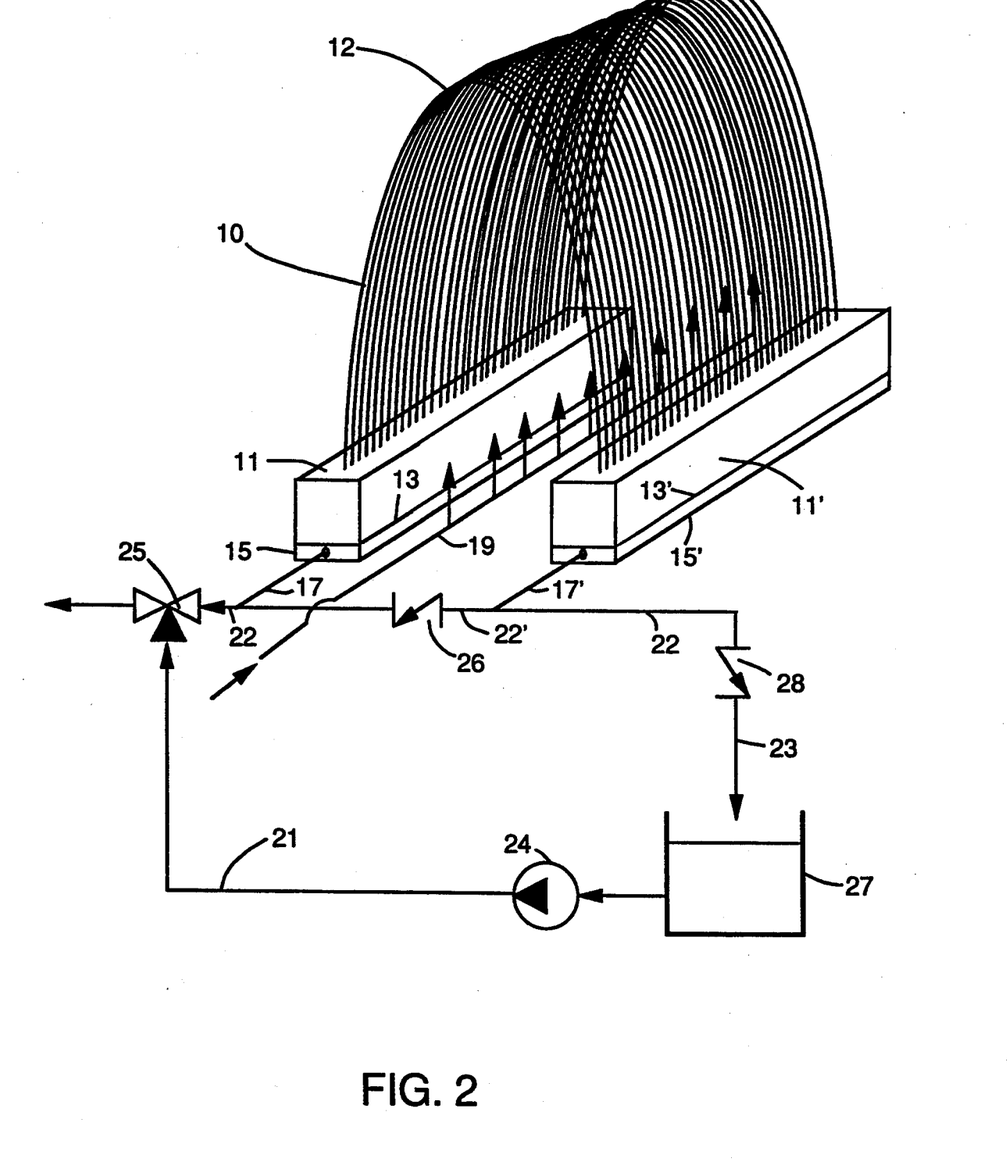
FIG. 2 is a perspective view schematically illustrating a membrane device disclosed in the '424 patent, comprising a frameless array of a skein of fibers, unsupported during operation of the device, with each set of the opposed ends of the fibers potted in one of two spaced apart headers, each atop and in open fluid communication with a permeate collection pan, and a permeate withdrawal conduit. By "unsupported" is meant "not supported during operation of the membrane device, except by the substrate".

The fibers are chosen with a view to performing their desired function and are non-randomly oriented in each array, and in the module as described in the '424 patent, the disclosure of which is incorporated by reference thereto as if fully set forth herein. In a frameless array such as is shown in FIG. 2, the direction of the flow of feed is immaterial as the direction in which the feed enters a lumen is generally transverse to the upstanding fibers. In a module housing one or more cartridges of wafers such as are shown in the '593 patent to Pedersen et al, the flow of feed through the module is over the fibers and orthogonal thereto. It is preferred to use banks of modules constructed as disclosed in the '424 patent, the disclosure as to the construction of which is incorporated by reference thereto as if fully set forth herein.

Typical hollow fiber membranes which are particularly amenable to being cleaned in situ have an i.d. in the range from 0.5 mm to 2.5 mm and have an o.d. in the range from 0.7 mm to 3.5 mm.

The average pore cross sectional diameter in a fiber may vary widely, being in the range from about 5Å to 2000Å. The preferred pore diameter for separation of components in a liquid feedstream is in the range from about 10Å to 200Å.

Unlike in a conventional module, the length of a fiber in a skein is essentially independent of the strength of the fiber, or its diameter, because the skein is buoyed, both by bubbles of oxygen-containing gas introduced if live aerobic bacteria are present, and the substrate in which it is deployed. The length of each fiber in the skein is preferably determined by the conditions under which the array is to operate. Typically fibers of a skein range from 1 m to about 10 m long, depending upon dimensions of the body of substrate (depth and width) in which the array is deployed. For the longer fiber, a larger diameter membrane is desirable to minimize the pressure drop through the fiber.

The number of fibers in an array is arbitrary, typically being in the range from about 1,000 to about 10,000, and the preferred surface area for a skein in commercial service is in the range from 10 m² to 100 m².

The materials for the headers are most preferably either thermosetting or thermoplastic synthetic resinous materials, optionally reinforced with glass fibers, boron or graphite fibers and the like. Thermoplastic materials are preferred for relatively low temperature service below 100° C., these being chosen so as to be sufficiently compatible with the material of the fibers to produce a lasting, fluid-tight bond. Such thermoplastic materials may be crystalline, such as polyolefins, polyamides (nylon), polycarbonates and the like, semi-crystalline such as polyetherether ketone (PEEK), or substantially amorphous, such as poly(vinyl chloride) (PVC), and the like. Thermosetting resins are preferred for higher temperature service, and for ease of use.

The particular method of securing the fibers in each of the headers is not narrowly critical, the choice depending upon the materials of the header and the fiber, and the cost of using a method other than potting. However, it is essential that each of the fibers be secured in fluid-tight relationship within each header. This may be effected by simply not bundling the terminal portions of the fibers too tightly before potting them.

Since there is very little hydraulic pressure, typically less than 1.33 bar (5 psig) exerted by the cleaning fluid in the pores of the membrane while the fluid is recirculated through the membrane, and insufficient pressure to cause hydraulic flow of solution through the pores even if pulsed, the flux obtained with the solution, is essentially diffusion-controlled and foulants lodged in the pores cannot be dislodged by hydraulic pressure. Instead, foulants are dissolved or degraded by chemical action. The main purpose of pulsing is to avoid, to the extent possible, diffusion flow through pores which are already open and offer the path of least resistance. Pulsing at low pressure, less than about 20 psig (240 kPa) tends to distribute the biocidal solution randomly and isotropically under the inner surface of the membrane.

Reverting to FIG. 2 there is shown in perspective view a membrane device referred to generally by reference numeral 10, comprising an upstream header 11 and a downstream header 11', one being substantially identical to the other, upstream and downstream collection pans 15 and 15' to collect the permeate, and their respective permeate withdrawal conduits 17 and 17'. The purpose of the headers 11 and 11' is to pot fibers 12 in spaced apart relationship with each other in a potting resin such as an epoxy. The headers are conveniently formed as described in the '424 patent, but any other method may be used which serves the aforementioned purpose. The bases 13 and 13' of each header are snugly accommodated in collection pans 15 and 15' sized to the base 13 above a permeate collection zone within the pan. Air is provided through a gas distribution means 19 to maintain beneficial bacteria present in the dirty water. Permeate withdrawn into the lumens of the fibers, preferably under suction, collects in the pans and is discharged to a collection point as is described in the '424 patent, until the flow of permeate is about one-half of the flow at initial stable flux, at which time the flow of dirty water is shut off so that the lumens of the fibers remain filled with permeate, and the cleaning cycle is commenced.

Conduits 21, 22 and 23 are provided as shown, connecting the lumens of fibers 12 in valved communication with the discharge of a pump 24 via a 3-way valve 25, which in one of its positions allows permeate to be withdrawn from the headers. Conduit 22 serves as a manifold for the collection pans 15, and an intermediate portion 22' of the conduit 22 is provided with a check valve 26 which allows biocidal solution held in cleaning tank 27 to be circulated through the lumens of fibers 12, and returned through conduit 23 to the tank 27. A check valve 28 is provided in conduit 23 to shut off flow of either permeate or biocidal solution to the cleaning tank.

The 3-way valve 25 is positioned to flow biocidal solution to the upstream collection pan and enough solution is pumped from tank 27 to fill the upstream collection pan and the lumens of the fibers 12, then flow into the downstream collection pan from which it is returned to the tank 27. Check valve 23 is left open when cleaning solution is either circulated with pump 24 or pulsed when a pulse pump is substituted for pump 24. In those instances where it is desired to "dead end" the biocidal solution under only enough pressure to permit its diffusion-controlled flow out of the fibers, both the check valves 26 and 28 are closed.

Figure 3:
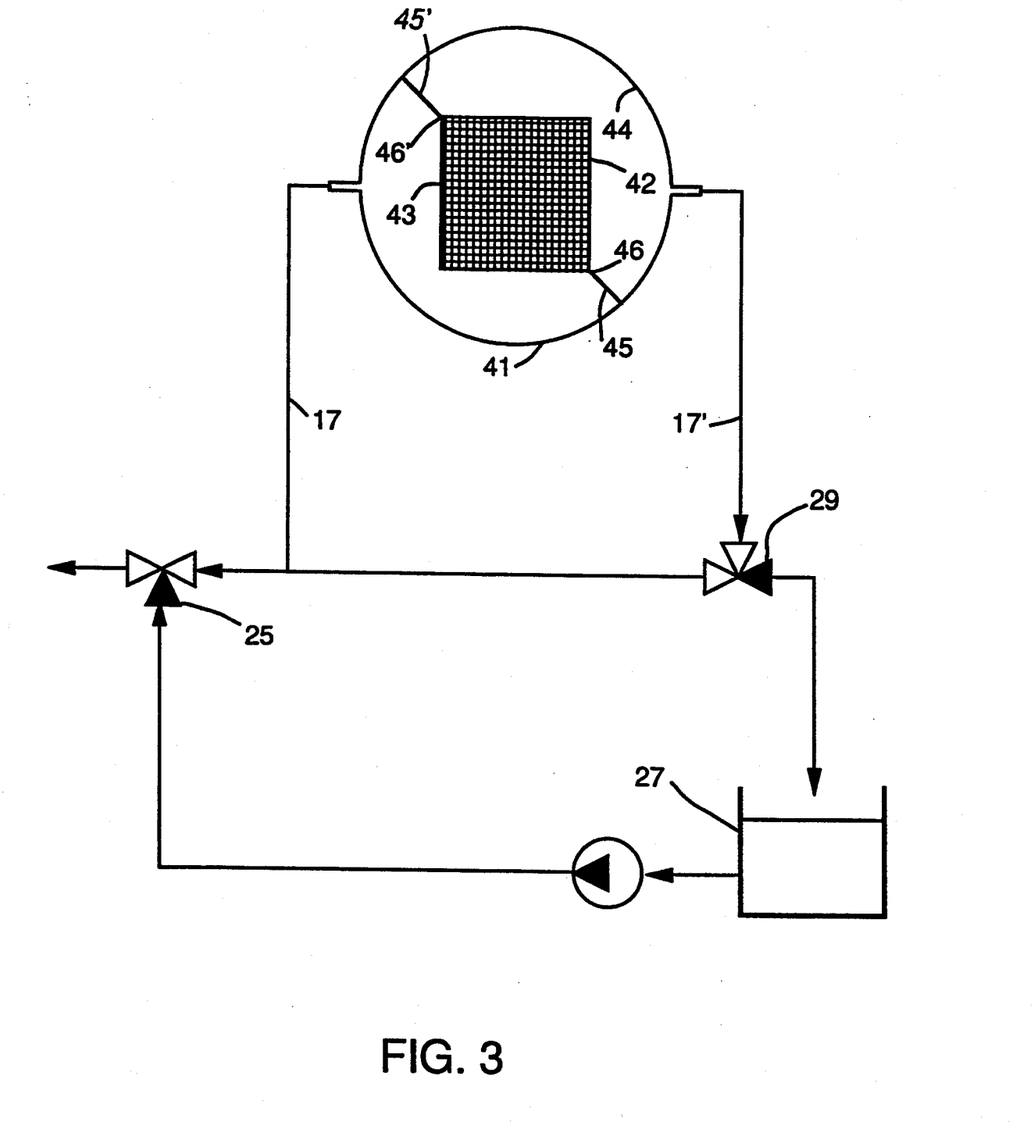
FIG. 3 diagrammatically illustrates the cleaning of a cartridge of wafers comprising arrays of hollow fiber MF membranes, the cartridge being housed in a shell through which feed is flowed in outside-in flow.

Referring to FIG. 3, there is shown a module 40 having a shell 41 within which at least one cartridge 42 of wafers (only the rectangular-mesh protective screen 43 on the topmost wafer is visible) is disposed between upper and lower feed plates 44 and 44' (not visible in this view) which are longitudinally axially connected with diametrical baffles 45 and 45' which extend the length of the shell and fit in fluid-tight relationship with diagonally opposed ends 46 and 46' of the cartridge so that the permeate side of the shell is divided into two separate permeate withdrawal zones. The fibers in each wafer are in parallel spaced apart relationship and discharge permeate under suction conditions into both permeate withdrawal zones when dirty water is flowed axially through the center of the module as described in greater detail in the '593 patent.

Again, when the flow of permeate is about one-half the flow at initial stable flux, indicating the flux has decreased to about half, the feed is shut off and the cleaning cycle commenced. The feed does not need to be shut off since it does not interfere with the effectiveness of the cleaning cycle. However, the bubblepoint may change depending upon the exerted hydrostatic pressure.

As illustrated in FIG. 3, biocidal solution is circulated through conduits analogous to those used in the prior embodiment, except that a 3-way valve 29 is substituted for check valves 26 and 28 in FIG. 2. In the positions shown, the 3-way valves indicate that permeate is being withdrawn from the module 40 through permeate withdrawal conduits 17 and 17'. As before when it is desired to clean the outer surfaces of the fibers, biocidal solution is circulated through their lumens until the flux is restored to at least 70% of the initial stable flux, and preferably to more than 80%. After the biocidal solution is drained to the tank 27, permeate withdrawal in normal operation is re-commenced. As before, the flow of dirty water need not be shut off. If shut off the dirty water remains in the casing outside the tube and in contact with the biofilm on the outer surface of the membrane 54.

Figure 4:
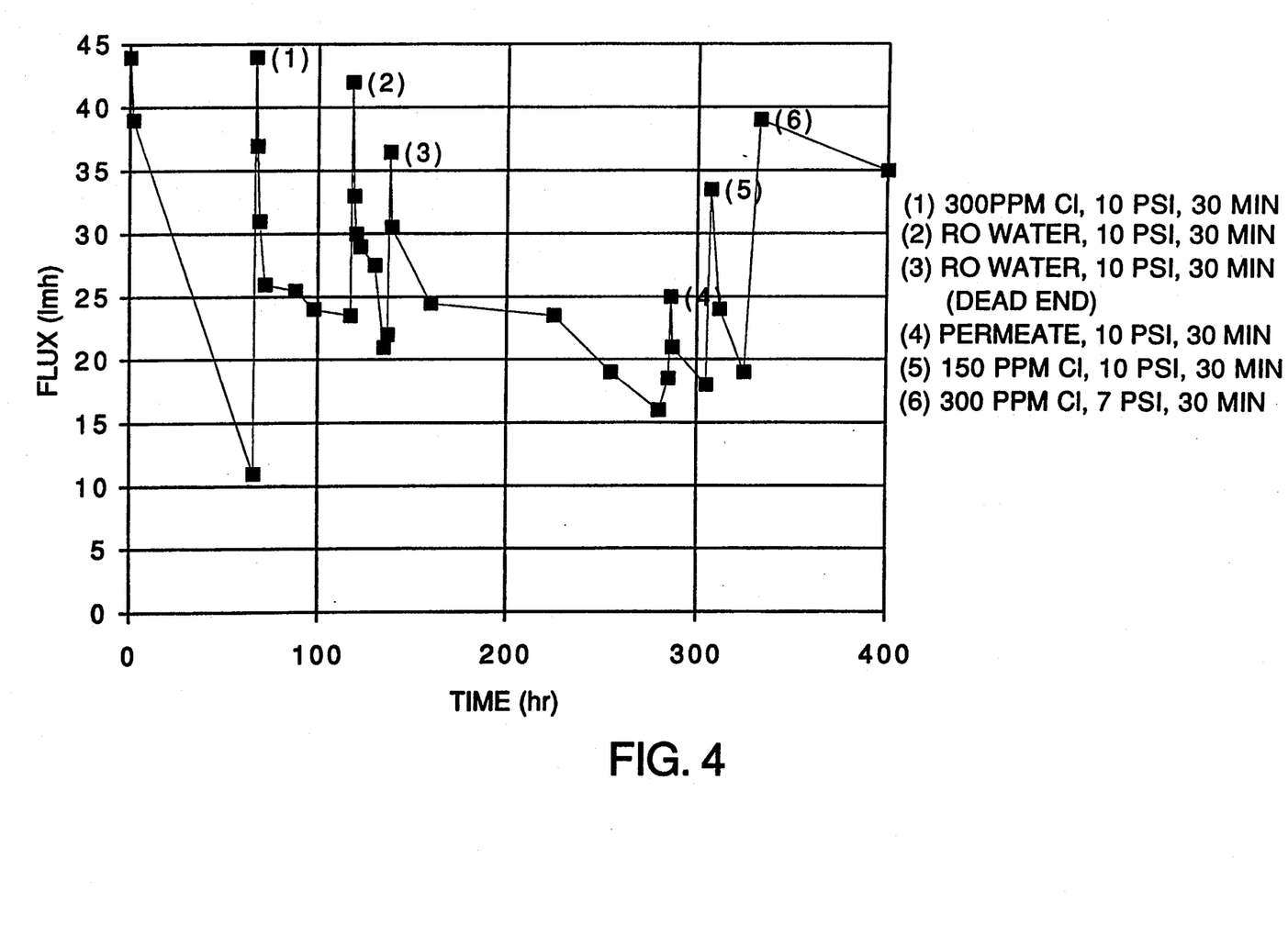
FIG. 4 is a graph in which the variation of flux is plotted as a function of time, comparing the results obtained by back-flushing the lumens of polysulfone fibers with (i) permeate, (ii) deionized water, and (iii) a dilute solution of sodium hypochlorite (NaOCl) at concentrations which provided 150 ppm or 300 ppm "active" oxidizing anion all back-washed for the same amount of time, 30 min at a maximum continuous pressure of 245 kPa (30 psig).

Referring to FIG. 4, there is plotted the results of a pilot plant test in which the effect of various back-flushes, each having a duration of 30 min, and carried out sequentially, was evaluated. The integers in brackets identify the value of the flux after the array was back-flushed with the solution/water/permeate identified, as follows: (1) 300 ppm Cl as NaOCl solution at 170 kPa (10 psig); (2) RO water at 170 kPa; (3) RO water at 170 kPa, dead-ended; (4) permeate at 170 kPa; (5) 150 ppm Cl as NaOCl solution; (6) 300 ppm Cl as NaOCl solution at 150 kPa.

The foregoing tests were carried out with a frameless array of polysulfone fibers in a module analogous to one shown in FIG. 2, comprising 110 MF fibers each 2 meters long, having an o.d. of 1.5 mm, an i.d. of 1.0 mm, and pores having a nominal diameter of about 0.15 $\mu$m, the majority of which are smaller than 0.15 $\mu$m, the smallest being about 0.08 $\mu$m and the largest 0.35 $\mu$m, as determined by liquid displacement porometry. The array is fully immersed in a tank deep enough to immerse the vertex of the parabolic array which vertex is about 0.75 meter above the bottom of the tank. Domestic wastewater is fed to the tank. As is evident from FIG. 5, the initial flux is about 44 LMH, but the initial stable flux after a soak period of 4 hr is 38 LMH under a permeate withdrawal suction of 25.4 cm of Hg. After 72 hr the flux decreases to about 12 LMH, and the permeate being withdrawn is drained to storage. Without moving the array, the piping is configured to recycle a 300 ppm Cl NaOCl solution through the lumens by positioning the 3-way valve 25, closing check valve 26 and opening check valve 28 (see FIG. 3). On the scale illustrated, the 30 min period for back-flushing is not visible. Though restoration to the initial stable flux is not instantaneous (as evident from the inclination of the near-vertical line) after circulation of the biocidal solution is stopped, it is clear that the recovery is rapid.

The pressure of 170 kPa was arrived at by trial and error for the particular fibers used, this pressure being sufficient to provide diffusion-controlled flow, the rate of which was not noticeably changed between 150-170 kPa. At 190 kPa the rate of flow was noticeably increased indicating flow under pressure due to developed hydraulic forces.

The 300 ppm $OCl^-$ concentration was arrived at with a little trial and error during which it was determined that higher concentrations provided a rapidly increasing "kill" of cells in the medium without a correspondingly high improvement in flux; lower concentrations provided correspondingly lower kills and unnecessarily prolonged the time required to attain the initial stable flux.

The biocidal solution was made from a commercially available Javex bleach solution containing 5.25% NaOCl, and 300 ppm was made up according to the following calculations:

so that 1.45 g NaOCl yields 1 g $OCl^-$ and for a 300 ppm $OCl^-$ solution the concentration of Javex solution needed is (1.45 g NaOCl/g $OCl^-$)(1 ml Javex/0.0525 g NaOCl)(300 mg/L) =8.28 ml Javex solution/L of water It is evident from the data presented in FIG. 4 that the initial cleaning with 300 ppm $OCl^-$ restored the flux to (1), essentially its original value. During the next cycle of permeate withdrawal, flux measurements were made every 12 hr. As seen, the last two measurements were substantially identical at 24 LMH when the back-flushing cycle was initiated with RO water which restored the flux to (2), about 42 LMH. When the back-flushing was repeated with RO water at the same pressure as the previous cycle, except that the check valve 28 was closed so the RO water was dead-ended. This was expected to provide better cleaning than was obtained with RO water which was not deadended, but the flux was restored only to (3) about 36.5 LMH.

The following cleaning cycle was not started until the flux had deteriorated from 36.5 LMH to about 16.5 LMH, when the tank of cleaning solution was emptied, and the permeate diverted into it. The array was then back-flushed with permeate which was recirculated through the array for 30 min at 170 kPa. The flux was restored to (4), about 25 LMH.

To determine the effect of a half-strength biocidal solution, when the flux had decreased from 25 LMH to 18 LMH, the array was back-flushed with 150 ppm $OCl^-$ solution for 30 min at 170 kPa. The effect was to restore the flux to a value of 33.5 LMH (5) which was higher than the flux (25 LMH) before it decreased.

The following cleaning cycle was initiated when the flux decreased from 33.5 LMH to 19 LMH, when the array was back-flushed with 300 ppm $OCl^-$ solution for 30 min at 150 kPa, a lower pressure than was used in cycle (1). The effect was to restore the flux to 39 LMH which is substantially the same as the initial stable flux.

It is evident from the foregoing that the effectiveness of the biocidal solution even at the low pressure of 170 kPa and low concentration of 300 ppm $OCl^-$ was excellent.

Referring to FIG. 5, there is plotted the results of a pilot plant test in which a frameless array analogous to that shown in FIG. 2, of 1400 MF fibers each 2 meters long, having an o.d. of 2 mm, an i.d. of 1.5 mm, and pores having a nominal diameter of about 0.15 $\mu$m, the majority of which are smaller than 0.15 $\mu$m, the smallest being about 0.08 $\mu$m and the largest 0.35 $\mu$m. The array is fully immersed in a tank into which domestic wastewater is fed. The initial stable flux after a soak period of 4 hr is 78 LMH. When, after 24 hr the flux decreases to about 46 LMH, the permeate in the lumens is drained to permeate storage, and the piping configured for circulating the 300 ppm $OCl^-$ biocidal solution as described hereinabove for FIG. 4. As before, the 15 min period for back-flushing is not visible on the graph. Again, from the steep, nearly vertical rise of the flux recovery, it is evident that restoration of the flux was rapid.

Details of the run in FIG. 4 over a period of 10 days are as follows:

| | |
|---|---|
| Influent flowrate | 9.408 L/min |
| Influent suspended solids | 1800 mg/L |
| Mixed liquor temperature | 25° C. |
| Mixed liquor suspended solids | 15,800 mg/L |
| Mixed liquor volatile suspended solids | 13,700 mg/L |
| Mixed liquor dissolved solids | 1,300 mg/L |
| Mixed liquor $BOD_5$ | 600 mg/L |
| Mixed liquor COD | 14,400 mg/L |
| Mixed liquor pH | 7.2 |
| Membrane outer surface area | 13 $m^2$ |
| Operating suction on permeate side | 25.4 cm Hg (35 kPa) |
| Airflow to module | 15 SCFM |
| Pressure of biocidal solution | 5 psig |
| Flowrate of biocidal solution | 2 L/min |
| Volume of biocidal solution diffused into tank | 2 L |
| Permeate turbidity | 0.600 NTU |
| Permeate $BOD_5$ | <1 mg/L |
| Permeate COD | 35.9 mg/L |
| Suspended solids in permeate | <1 mg/L |
| Total coliform count in permeate | 12 CFU/100 ml |

Figure 6:
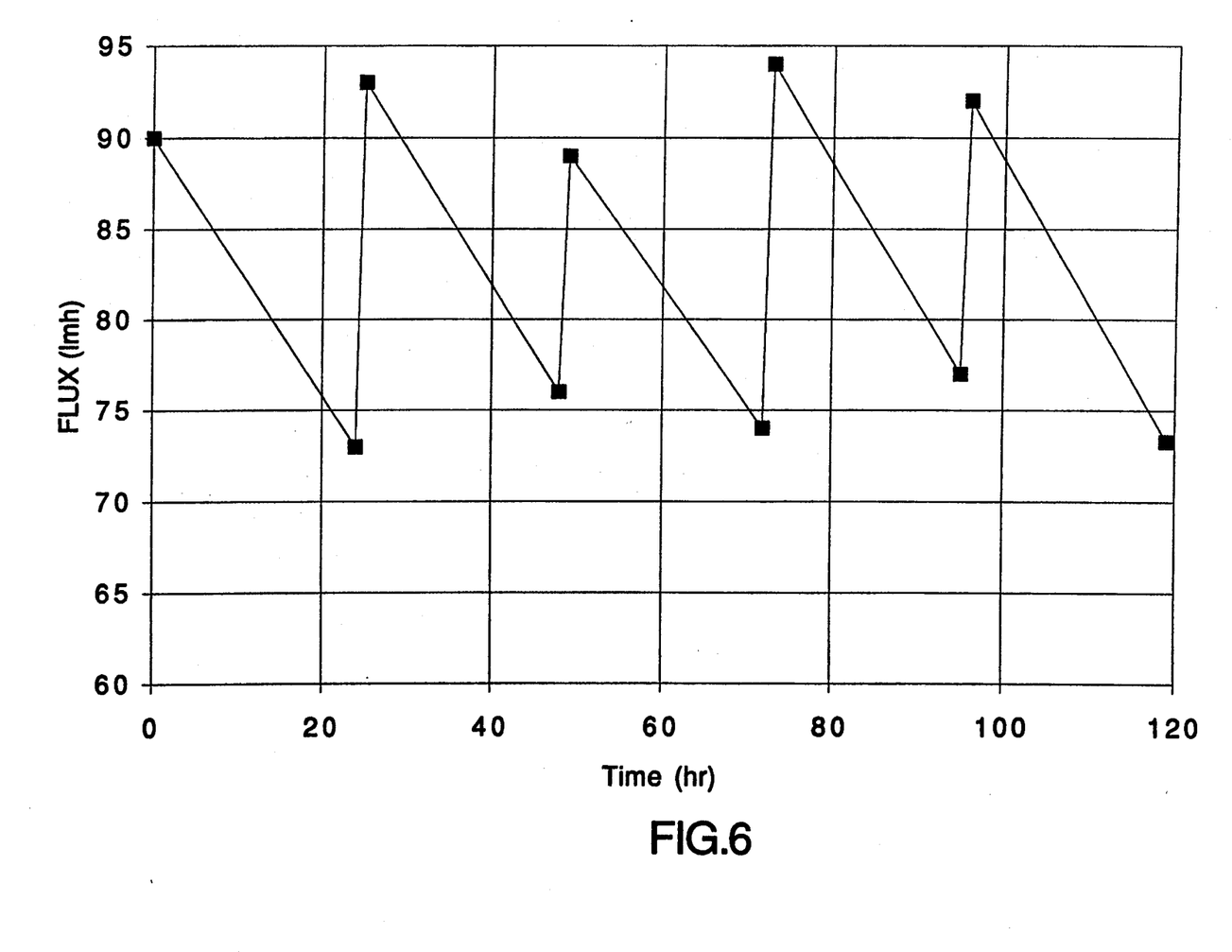
FIG. 6 is a graph in which the variation of flux is plotted as a function of time, showing the results obtained by back-flushing for only 15 min per 24 hr of operation, the lumens of polyfluorovinylpyrrolidone fibers used to filter groundwater containing a high level 0.4 ppm of iron and manganese (2.1 ppm) after the fibers are fouled sufficiently to decrease their initial transmembrane flux by about 15%.

Referring to FIG. 6, there is plotted the results of a pilot plant test for recovering purified water from groundwater flowing into a tank in which a frameless array analogous to that shown in FIG. 2, is immersed. As permeate is withdrawn, the groundwater is concentrated into an aqueous substrate. A portion of this substrate is purged either continuously or periodically, to maintain a desired concentration of contaminants in the substrate.

The array used 110 MF fluoropolymer fibers each 2 meters long, having an o.d. of 2 mm, an i.d. of 1.5 mm, and pores having a nominal diameter of about 0.15 $\mu$m, the majority of which are smaller than 0.15 $\mu$m, the smallest being about 0.08 $\mu$m and the largest 0.35 $\mu$m. The array is fully immersed in a tank into which the groundwater contaminated with iron and manganese salts, is fed. The initial stable flux after a soak period of 4 hr is 90 LMH. When, after 24 hr the flux decreases to about 73 LMH, the permeate in the lumens is drained to permeate storage, and the piping configured for circulating the citric acid @pH 2.5 as described hereinabove for FIG. 4. As before, the 15 min period for back-flushing is not visible on the graph. Again, from the steep, nearly vertical rise of the flux recovery, it is evident that restoration of the flux was rapid. After 5 permeate withdrawal and cleaning cycles, it is evident that there is no substantial loss of flux relative to the initial stable flux.

Details of the run with groundwater in FIG. 6 over a period of 120 hr are as follows:

| | |
|---|---|
| Influent flowrate | 1.0 L/min |
| Influent iron | 0.4 ppm |
| Influent manganese | 1.1 ppm |
| Substrate temperature | 14° C. |

| -continued | |
|---|---|
| Concentration of iron in substrate | 3.3 ppm |
| Concentration of manganese in substrate | 2.1 ppm |
| pH of substrate | 10.5 |
| Cleaning solution | citric acid at pH 2.5 |
| Duration - cleaning period | 15 min/24 hr |
| Pressure of citric acid solution | 5 psig |
| Circulation rate of citric acid | 2 liters/min |
| Membrane surface area | 1 m$^2$ |
| Operating suction, permeate side | 25.4 cm Hg (35 kPa) |
| Airflow to module | 0.28 m$^3$/min (1.5 SCFM) |
| Permeate turbidity | 0.600 NTU |
| Permeate iron | 0.06 ppm |
| Permeate manganese | 0.05 ppm |

Figure 7:
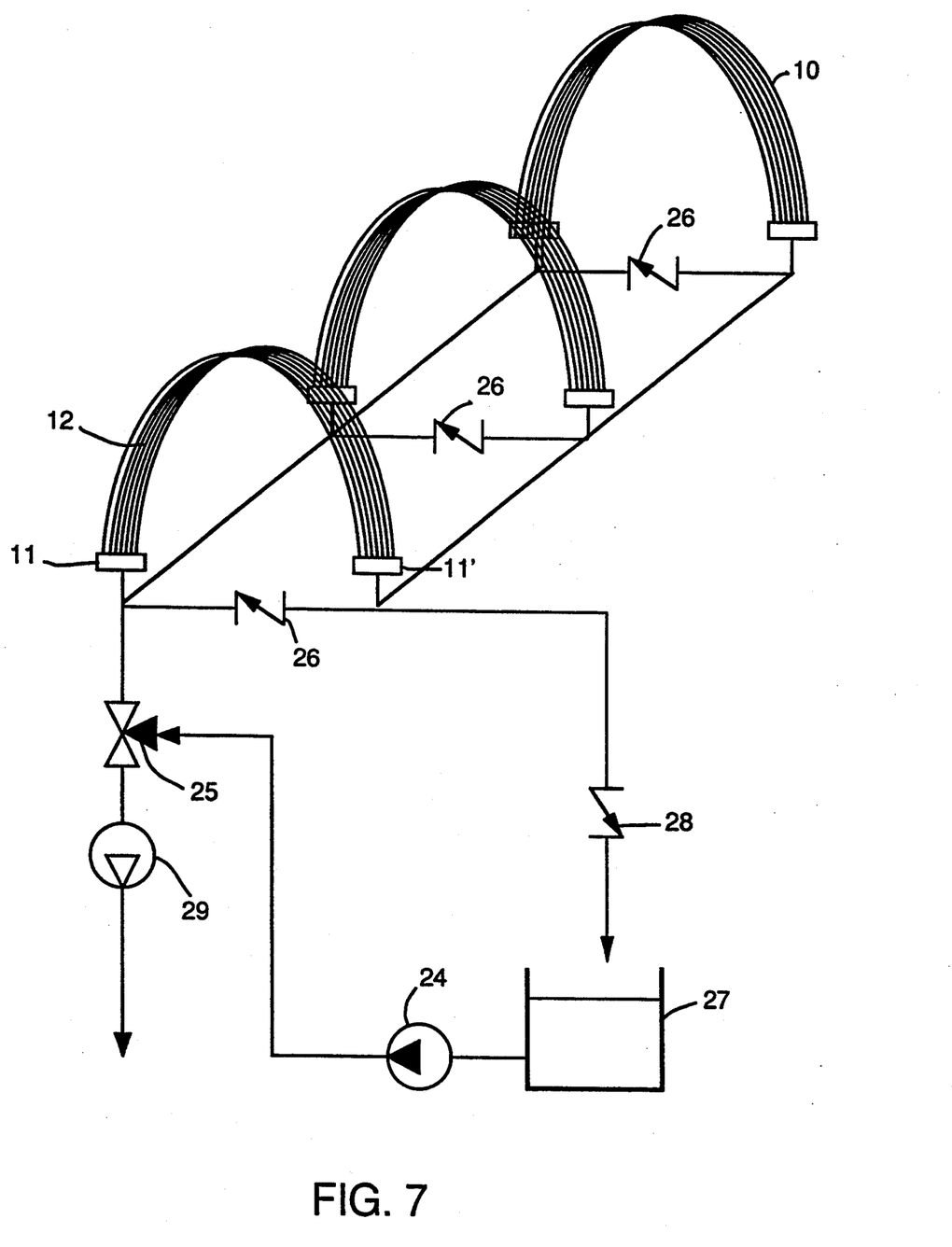
FIG. 7 schematically illustrates a single bank of 3 modules, in a large tank (not shown) of non-sterile ground water, each of which modules is similar in construction to the one with the frameless array shown in FIG. 1; and, the simplicity of the piping scheme to clean the bank in place, without having to drain the feed tank.

Referring to FIG. 7 is schematically illustrated the use of 3 modules of frameless arrays of fibers freely swaying in skeins above headers which are manifolded for withdrawal of permeate from the lumens, in the medium of a reservoir in which beneficial aerobic bacteria are nourished. Conduits for supplying air under the skeins are not shown. As indicated, the cleaning cycles of each module may be undertaken separately, or they may be cleaned together. In each case, the flow of cleaning solution is not blocked through the skeins of fibers.

Figure 8:
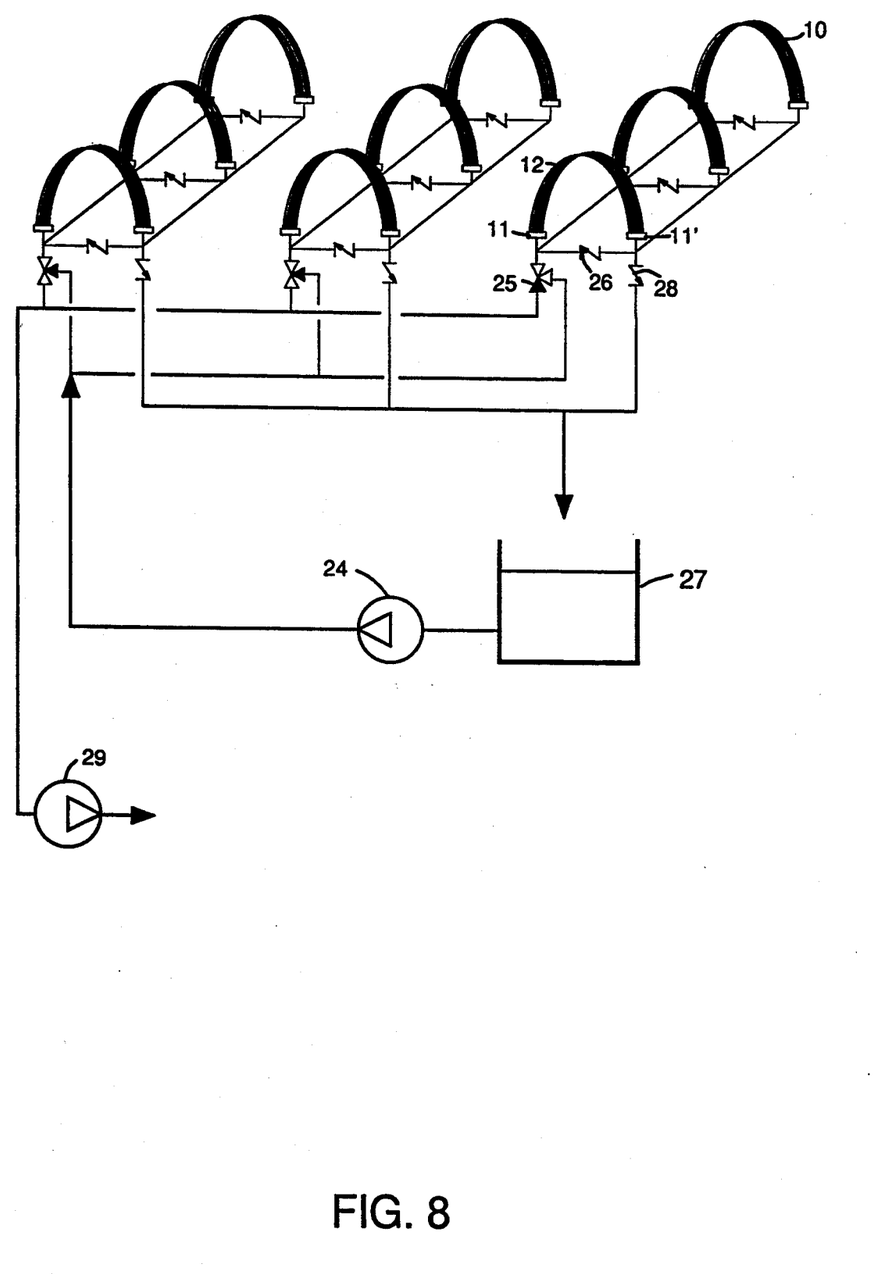
FIG. 8 diagrammatically illustrates the use in a single large body of bacterially contaminated water, such as a lake (not shown) of 4 banks, each having 3 modules, each of which banks is similar in configuration to the one shown in FIG. 7; and the simplicity of the piping scheme to clean all 4 banks in place, concurrently, without having to drain the feed tank.

Referring to FIG. 8 is schematically illustrated another, larger use than that described in FIG. 7. Again, in the medium of a reservoir in which beneficial aerobic bacteria are nourished, 4 banks of 3 modules each are manifolded for withdrawal of permeate from the lumens. As indicated, the cleaning cycles of each bank may be undertaken separately, or they may be cleaned together. In each case, the flow of cleaning solution is not blocked through the skeins of fibers.

Having thus provided a general discussion, described the overall cleaning process in detail and illustrated the invention with specific examples of the best mode of cleaning fiber membranes in a module containing the membranes, it will be evident that the invention has provided a simple but effective solution despite the teachings of the art. It is therefore to be understood that, no undue restrictions are to be imposed on the scope of this invention by reason of the specific embodiments illustrated and discussed, and, particularly that the invention is not to be restricted to a slavish adherence to the details set forth herein.

We claim:

1. In a system for withdrawing permeate from a multicomponent liquid substrate having particulate matter and a population of beneficial aerobic bacteria suspended therein, with a gas-scrubbed assembly comprising a frameless array of hollow fiber membranes in combination with a gas-distribution means, said system comprising, a reservoir containing a volume of at least 100 liters of said substrate from which a permeate is to be withdrawn; a pair of headers adapted to be mounted in spaced-apart relationship within said substrate without being confined in a modular shell, a first header having terminal end portions of a multiplicity of hollow fibers secured therein, and a second header having opposed terminal end portions of said hollow fibers secured therein, essentially all ends of said hollow fibers being open so as to discharge permeate through said headers, at least one header being disposed below a horizontal plane through the horizontal center plane of said one header; said hollow fibers formed from a material selected from the group consisting of an inorganic material and an organic synthetic resinous material, and swayably buoyantly deployed as a skein in a body of said substrate, said hollow fibers together having an outer surface area in excess of 10 m$^2$, each fiber having a length >0.5 m and sufficiently greater than the direct distance between said first and second headers, so as to present, when said skein is deployed, a generally arcuate configuration above a plane through the horizontal center-line of a headers; permeate collection means for collecting said permeate; means for mounting said spaced-apart headers in open fluid communication with said permeate collection means; means for withdrawing said permeate; and, said gas-distribution means disposed within a zone beneath said skein, and adapted to generate bubbles which flow upwardly through said skein, whereby said hollow fibers are kept awash in bubbles and resist the build-up of said particulate matter on the surfaces of said hollow fibers on which is generated a biofilm clogging pores of said membrane, yet affords an initial stable transmembrane flux which decreases during each withdrawal period as a function of time by at least 20%, the improvement comprising, (i) a container containing an aqueous solution of a biocidal oxidative electrolyte;

(ii) a conduit having a pump means in fluid connection with said fibers to flow said electrolyte in laminar flow through the lumens of said hollow fibers to permeate through said outer surfaces and said biofilm, at a pressure no higher than said membrane's bubble breakthrough pressure, but enough pressure to diffuse said solution through said pores and said biofilm, for a period sufficient to oxidize organic matter within said pores and in said biofilm so as to form a random distribution of pores through said biofilm and provide a restored flux equal to at least 70% of said initial stable flux;

(iii) conduit means operatively placing said permeate collection means in selectively open flow communication with said container; and, (iv) valve means operatively connected in said conduit means to alternately withdraw permeate from said collection means, and to recirculate said electrolyte through said hollow fibers.

2. The system of claim 1 wherein said bubble pressure breakthrough is no more than about 300 kPa (30 psig).

* * * * *